United States Patent [19]

Fitzgerald et al.

[11] Patent Number: 5,056,073
[45] Date of Patent: Oct. 8, 1991

[54] OPTICAL DISK CARTRIDGE HANDLING APPARATUS

[75] Inventors: Timothy P. Fitzgerald, Minneapolis; David J. Rother, Hastings; Darryl T. Wrolson, Chanhassen; Richard H. Nelson, Richfield; Robert E. Takala, Minnetonka, all of Minn.

[73] Assignee: 501 International Data Engineering, Inc., Eden Prairie, Minn.

[21] Appl. No.: 611,414

[22] Filed: Nov. 9, 1990

Related U.S. Application Data

[63] Continuation-in-part of Ser. No. 602,631, Oct. 24, 1990.

[51] Int. Cl.$^5$ .................... G11B 17/00; G11B 5/48; G11C 13/04
[52] U.S. Cl. .................................. 369/36; 360/34; 360/39; 369/92
[58] Field of Search .................... 369/34, 36, 37, 38, 369/39; 360/92

[56] References Cited

U.S. PATENT DOCUMENTS

| | | | |
|---|---|---|---|
| 4,607,354 | 8/1986 | Ishibashi et al. | 369/36 X |
| 4,675,856 | 6/1987 | Rudy et al. | 369/36 |
| 4,815,055 | 3/1989 | Fago Jr. | 369/36 |
| 4,817,070 | 3/1989 | Hug et al. | 369/36 |
| 4,817,071 | 3/1989 | Carlson et al. | 369/36 |
| 4,853,916 | 8/1989 | Tomita | 369/36 |

Primary Examiner—Stuart S. Levy
Assistant Examiner—Kenneth B. Wells
Attorney, Agent, or Firm—Palmatier & Sjoquist

[57] ABSTRACT

An optical disk cartridge handling apparatus for storing, handling, reading and writing of optical disks contained in cartridges which store data for a host computer. The apparatus comprises an import/export element for loading and unloading cartridges into the apparatus. A cartridge store or library with vertical slots therein stores the cartridges. The leftmost slot initially receives the cartridges from the import/export element. A flipper mechanism is adapted to receive one of the cartridges from either the cartridge store or one of preferably two optical disk drives suitably mounted below the cartridge store. A picker mechanism is mounted on the flipper mechanism and moves the cartridge into and out of the flipper mechanism. The flipper mechanism is adapted to invert or flip the cartridge. A traverse mechanism is also provided for moving the flipper mechanism along two axes of motion to move and/or pivot the flipper and picker mechanisms adjacent any of the slots of the cartridge store or the slots of either optical disc drive. Drive loader mechanisms may also be provided and are located in front of the optical disk drives for mechanically inserting the cartridge into either of the drives from the flipper mechanism. Optical sensors provide the apparatus with information as to the locations and orientations of the cartridges and the flipper, picker, traverse and drive loader mechanisms.

18 Claims, 10 Drawing Sheets

FIG. 5

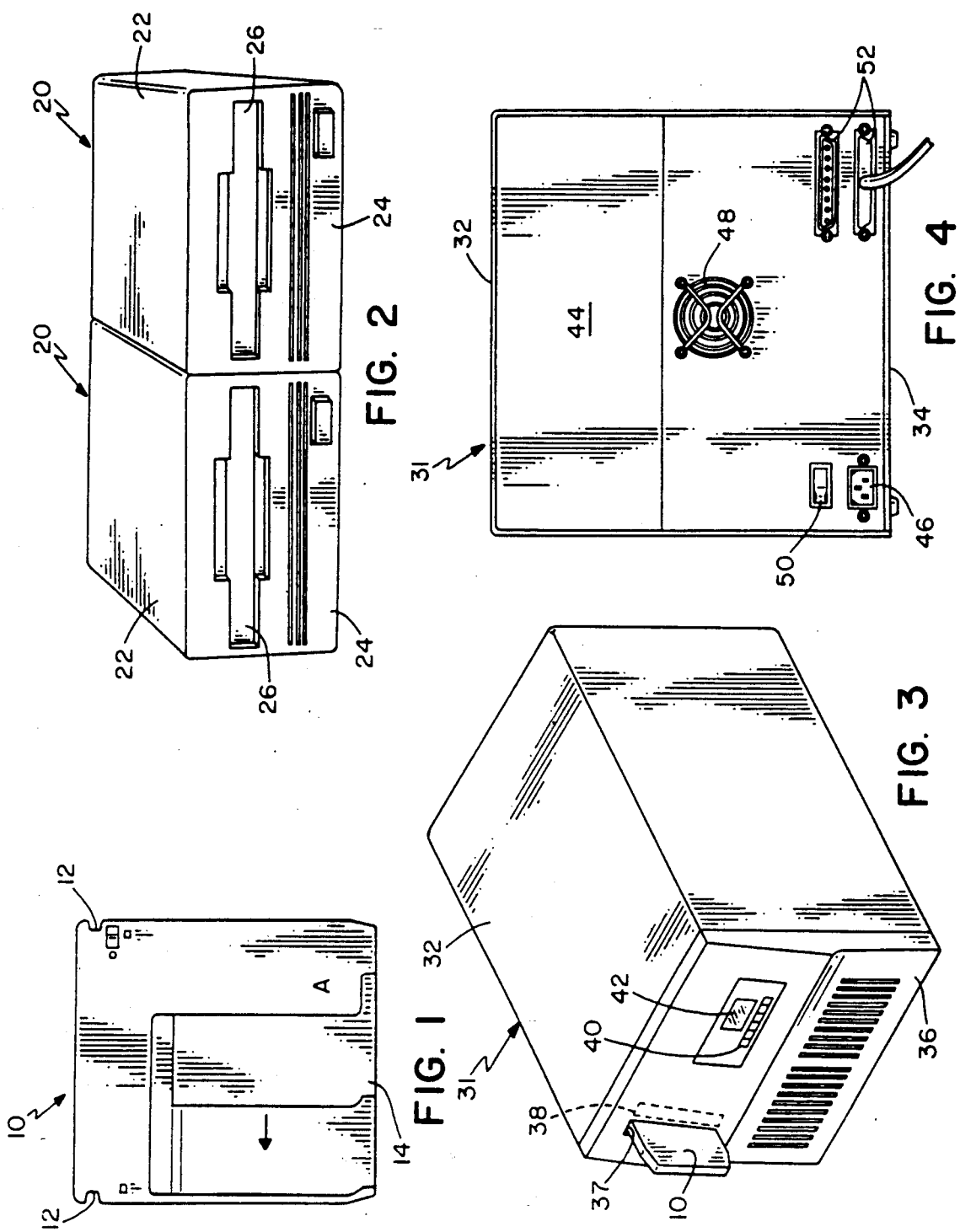

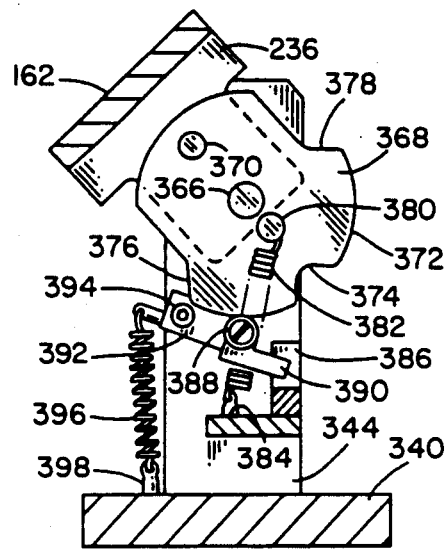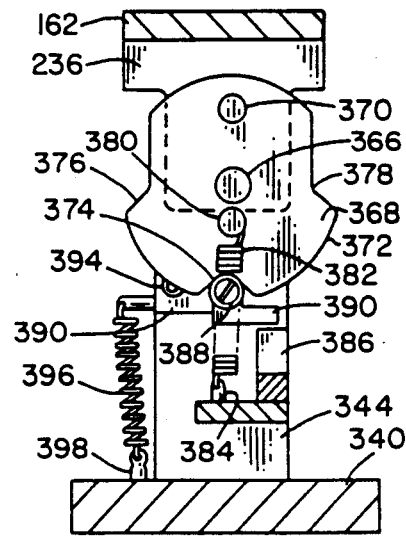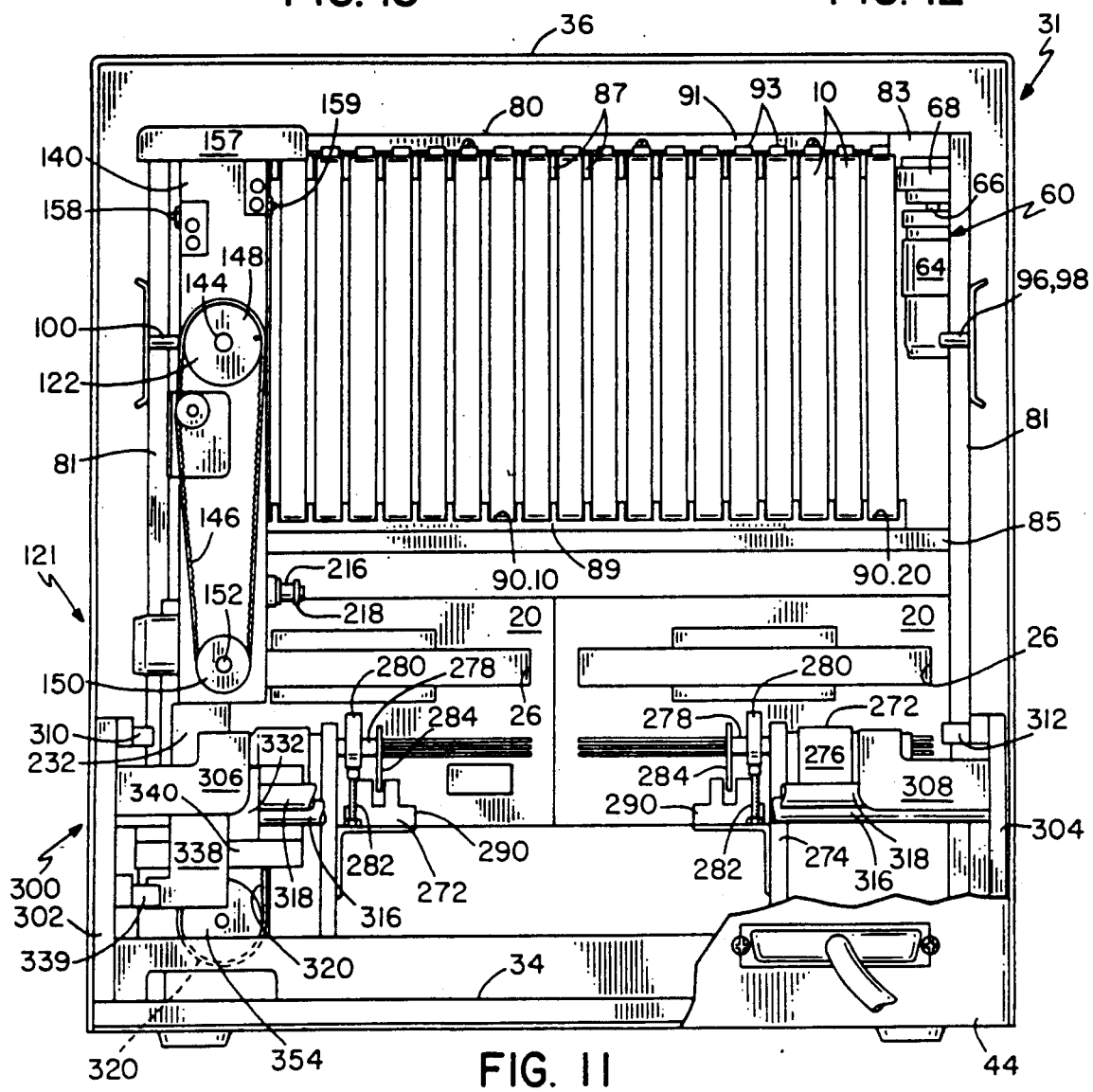

OPTICAL DISK CARTRIDGE HANDLING APPARATUS

This application is a Conintuation-In-Part of copending patent application Ser. No. 07/602,631 filed on Oct. 24, 1990 with the same inventorship and assignee, which is incorporated herein by reference.

BACKGROUND OF THE INVENTION

This invention relates to storage and handling of disk cartridges and more particularly to an optical disk cartridge handling apparatus which stores and handles optical disk cartridges for the manipulation of data by a host computer.

The storage of data in magnetic media, such as floppy disks or tapes, is well known. However, optical disks have been found to be highly advantageous over the magnetic media. This is so because the optical disks have high degrees of integrity and data storage capabilities together with a high level of sensitivity as well as environmental toughness.

As shown in FIG. 1, optical disks are each typically stored within an optical disk cartridge 10 to protect the disk from dust or dirt The cartridge 10 includes pick notches 12 which assist in orienting, loading and removal of a cartridge 10 into and out of an optical disk drive 20. Optical disks are readily available in the marketplace such as from Sony Corporation of Tokyo, Japan.

The optical disk within the cartridge 10 typically has a side A and side B identified by "A" or "B" on the protective cartridge and a sliding door (see arrow) which permits the drive 20 to gain access to one side of the optical disk within the protective cartridge 10. Typically, the cartridge 10 must be removed and inverted or flipped with reinsertion for the drive 20 to read side "B" or the side opposite side "A." This is typically required because most drives 20 have only one laser thereby requiring the disk to be flipped over for reading or writing the other side of the disk.

Optical disk drives or the data transfer means 20 are currently available in the market. The present invention contemplates using two drives 20 side by side as shown in FIG. 2. Five such available drives 20 that will illustratively work with the apparatus 31 disclosed and claimed herein are RICOH 5030E REWRITABLE, TOSHIBA WM-D070 WORM, PIONEER DD-U5001 WORM, SONY SMO D-501 REWRITABLE, and MAXOPTIX TAHITI REWRITABLE. The optical disk drives 20 typically have a housing 22, a front panel 24 and a slot 26 in front panel 24 through which the optical disk cartridge 10 is inserted and ejected. The reading and writing of data stored on the optical disk within cartridge 10 is performed by the drive 20 under the control of a host computer.

There is a need for an optical disk cartridge handling apparatus that will operate as a library to vertically store a large number of optical disk cartridges and which will place the cartridges within a particular drive 20 as well as remove and replace the cartridges in their storage location without the need for any manual assistance by the operator of the host computer.

SUMMARY OF THE INVENTION

An optical disk cartridge handling apparatus for storing, handling, reading and writing of optical disks contained in cartridges which store data for a host computer. The apparatus comprises an import/export element for loading and unloading cartridges into the apparatus. A cartridge store or library with vertical slots therein initially stores the cartridges. The leftmost slot initially receives the cartridges from the import/export element. A flipper mechanism is adapted to receive one of the cartridges from either the cartridge store or one of preferably two optical disk drives suitably mounted below the cartridge store. A picker mechanism is mounted on the flipper mechanism and moves the cartridge into and out of the flipper mechanism. The flipper mechanism is adapted to invert or flip the cartridge. A traverse mechanism is also provided for moving the flipper mechanism along two axes of motion to move and/or pivot the flipper and picker mechanisms adjacent any of the slots of the cartridge store or the slots of either optical disc drive. Drive loader mechanisms may also be provided and are located in front of the optical disk drives for mechanically inserting the cartridge into either of the drives from the flipper mechanism. Optical sensors provide the apparatus with information as to the locations and orientations of the cartridges and the flipper, picker, traverse and drive loader mechanisms.

A principal object and advantage of the optical disk cartridge handling apparatus of the present invention is that it provides for the automated storing, handling, reading and writing of large numbers of optical disks under the control of a host computer without the need for any manual assistance.

Another advantage of the present invention is its unique compact size, accuracy and smoothness in storing, handling, reading and writing of many optical disks stored in cartridges within the apparatus as heretofore not known.

Another object and advantage is that the present apparatus provides for vertical storage of the cartridges and disks which makes the disks less prone to dust contamination.

Another object and advantage of the present invention is its high level performance in accessing and handling the mass storage of data contained within the apparatus in relatively little time.

BRIEF DESCRIPTION OF THE DRAWINGS

FIG. 1 is a plan view of side A of an optical disk cartridge;

FIG. 2 is a perspective view of the optical disk drives or data transfer elements side by side;

FIG. 3 is a front perspective view of the present optical disk cartridge handling apparatus;

FIG. 4 is a rear elevational view of the apparatus;

FIG. 11 is a rear elevational view of the apparatus with the flipper mechanism adjacent the cartridge store;

FIG. 12 is a broken away, cross-sectional view of the cam arrangement of the upright traverse mechanism as might be taken along lines 12—12 of FIG. 16.

FIG. 13 is a broken away, cross-sectional view of the cam arrangement and the traverse mechanism beginning to pivot;

DESCRIPTION OF THE PREFERRED EMBODIMENT

Figure 5:
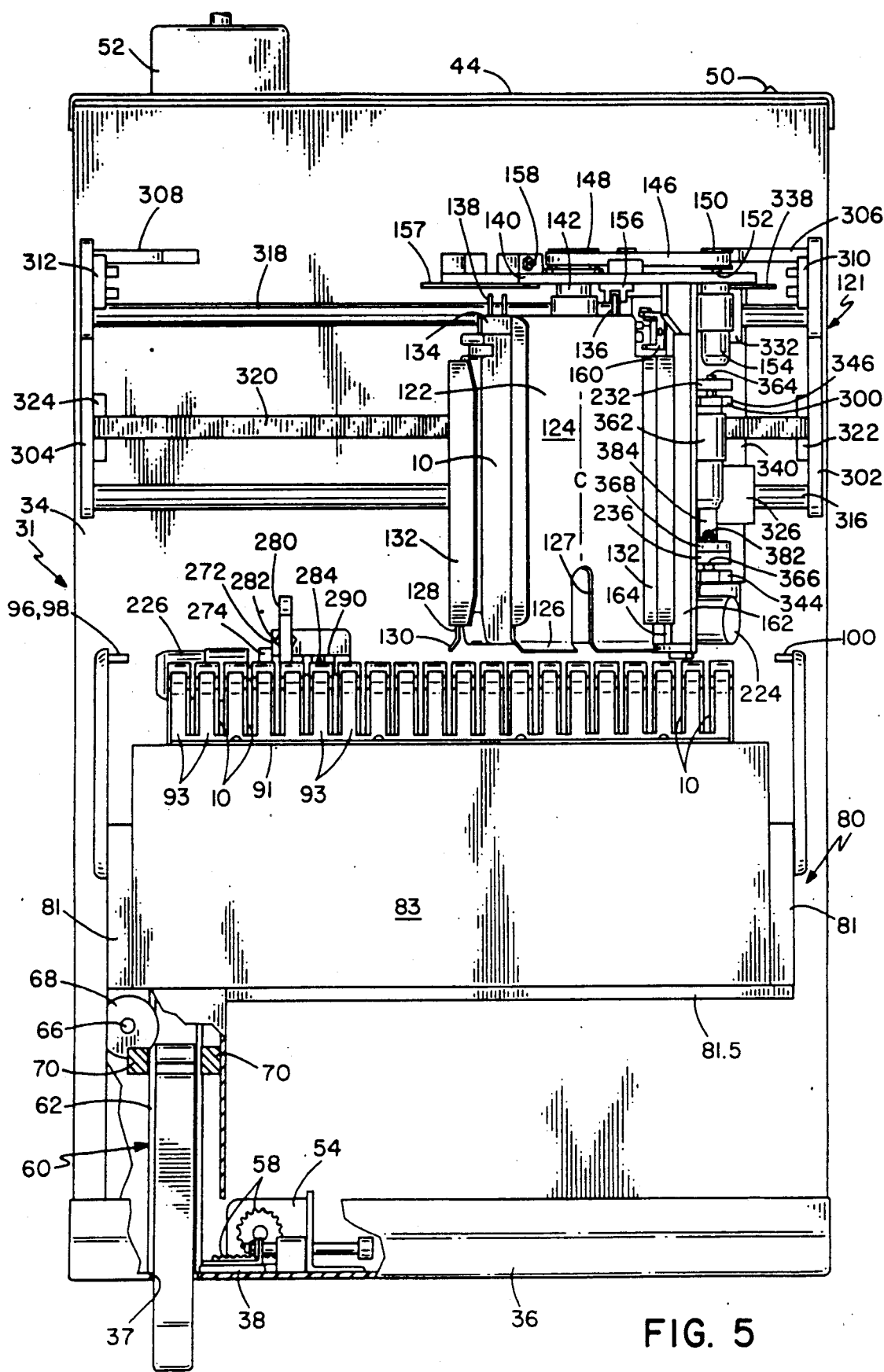
FIG. 5 is a top plan view of the apparatus with its housing removed.
Figure 6:
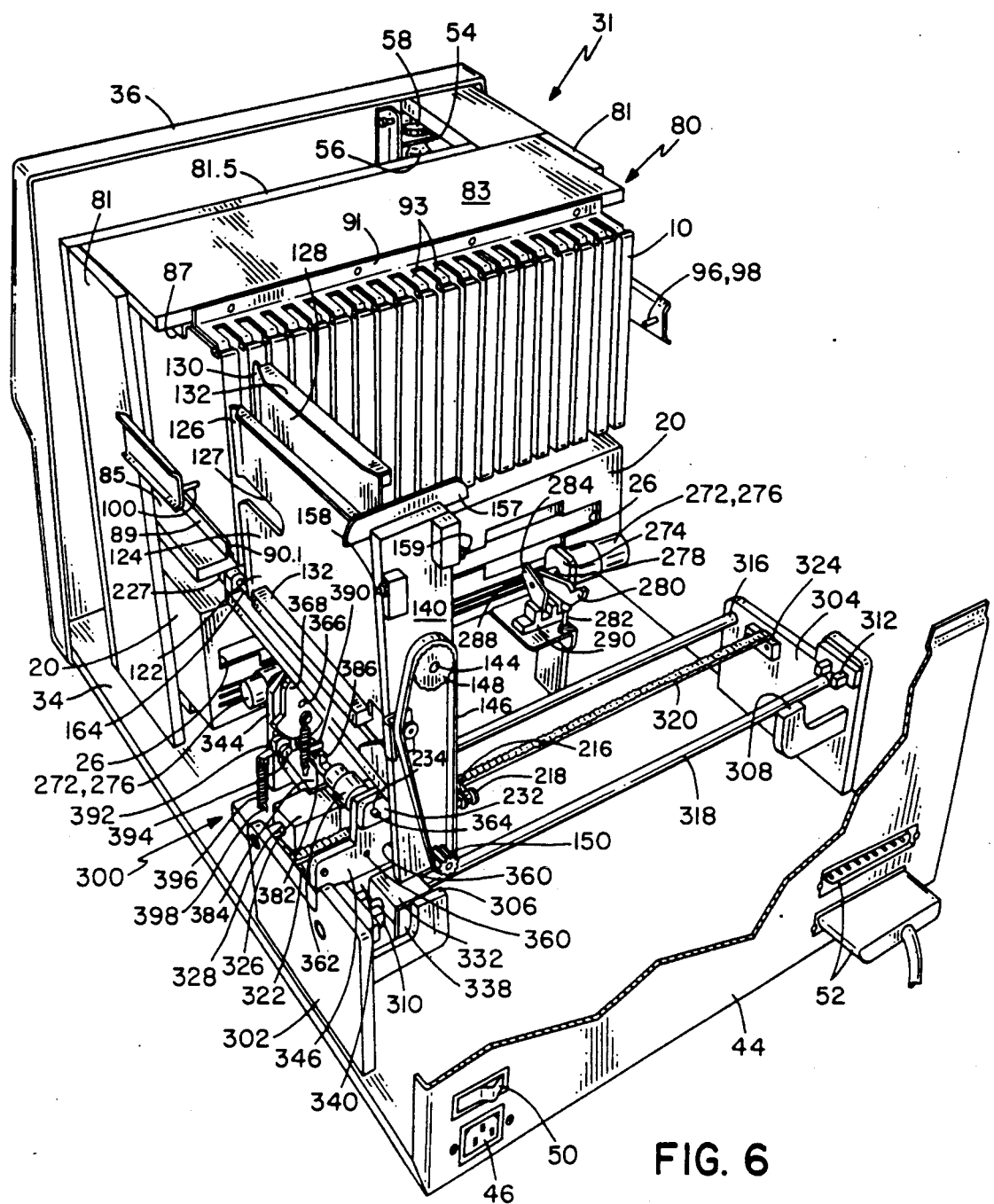
FIG. 6 is a rear perspective view of the apparatus.
Figure 7:
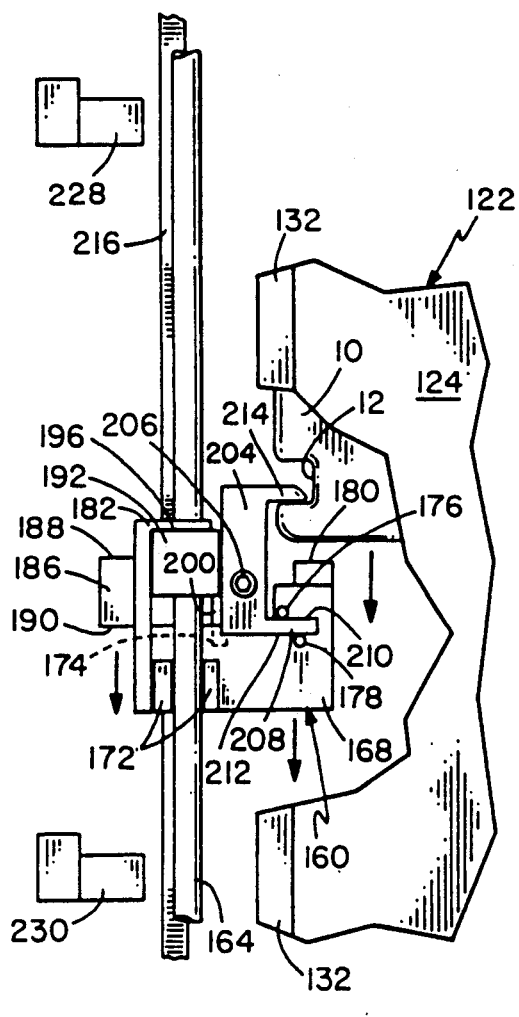
FIG. 7 is the same as FIG. 14 of applicant's copending referenced patent application which is an enlarged top plan view of the picker mechanism drawing a cartridge into the flipper mechanism.

The optical disk cartridge handling apparatus 31 has an outer housing 32 which is supported by a base plate 34. A front panel 36 offers to the user a slot 37, closable by a sliding door 38 along with a key pad 40 and a display 42. The back wall 44 has therein a power plug 46, fan 48 for cooling the apparatus 31 and a power switch 50. SCSI plug and connectors 52 connect the apparatus 31 to a host computer (not shown) which controls the operation of the apparatus by way of the SCSI bus using SCSI common command set commands. On the back side of front panel 36 is mounted a motor bracket 54 which supports a door motor 56. A rack and gear assembly 58 connects the door motor 56 with sliding door 38 for opening and closing of the slot 37.

Referring to FIGS. 5-19, the major components of apparatus 31 may generally be seen with housing 32 removed. The optical disk cartridge handling apparatus 31 generally comprises an import/export element 60, cartridge or media store 80, a media transport element 121 including flipper mechanism 122, picker mechanism 160, drive loader mechanism 172 and traverse mechanism 300. The previously mentioned commercially available optical disk drives 20 are suitable within the apparatus 31 mounted in a side by side arrangement immediately below the cartridge store 80.

The import/export element 60 is located on the inside of front panel 36 just behind sliding door 38 when it is in the closed position. A carriage 62 is adapted to receive an optical disk cartridge 10. A motor bracket 63 is adjacent carriage 62 and supports an import/export motor 64. Motor 64 has a rotatable drive shaft 66 supporting a rubber tire or wheel 68 which will readily grip the flat surface of an optical disk cartridge 10. Tire 68 will move a cartridge 10 in or out of carriage 62 in either direction be it out of apparatus 31 through slot 37 or into the cartridge store 80.

An optical or photointerruptor sensor 70 optionally may be located within the import/export element 60 and positioned so that the cartridge 10 will pass between the emitter and collector of sensor 70. Such sensor means are sometimes referred to as "optos" in the industry. Sensor 70 can sense the presence of the cartridge 10 as it is placed into the import/export element 60 through slot 37. Initially, the sliding door 38 is moved to expose slot 37. A sensor 70 will sense the existence of cartridge 10 within the carriage 62 and engage motor 64 which will drive rubber wheel 68 to move the cartridge into the cartridge or media store 80. Should the cartridge 10 be placed into the import/export element 60 backwards, the firmware together with the microprocessor will activate motor 64 and drive the cartridge 10 out of the carriage 62 through the slot 37 and by retracted sliding door 38. Omron Tateisi Electronics Company of Osaka, Japan, manufactures and markets a suitable photointerruptor 70 designated under the part no. EE-SX461-P11.

Centrally located on base plate 34 is cartridge or media store 80. Store 80 includes vertical side plates 81, vertical rear plate 81.5, top plate 83 and bottom plate 85. Top plastic guide panel 87 is mounted on the underside of top plate 83 and bottom plastic panel 89 is mounted on the top side of bottom plate 85. Guide panels 87 and 89 form vertical slots 90.1 to 90.20. Illustratively, 20 verticals slots or storage elements 90 are shown in cartridge store 80 and are numbered from the right side of apparatus 31. Conceivably more or less slots 90 could be contained in cartridge or media store 80. Vertical rear plate 81.5 suitably may have various openings therein to accommodate th import/export element as well as the mounting of optical disk drive 20 between vertical side plates 81 immediately below the vertical slots 90.

The storekeeper bracket 91 is appropriately affixed to the front side of top plate 83 and supports a comb 93 wherein the individual comb elements maintain the alignment of optical disc cartridges 10 within cartridge media store 80 by engagement with pick notches 12. Should any of the optical disk cartridges 10 be jarred or accidently moved out of the cartridge store 80, the discreet optical sensor 96, including emitter 98 and receiver 100, will sense this occurrence and stop all operations within the apparatus 31 until all cartridges 10 are again properly aligned within the cartridge or media store 80. General Electric of Auburn, N.Y., manufactures a suitable infrared emitter and collector marketed under part nos. F5D1 and L14G3.

The media transport element 121 includes the flipper mechanism 122 as well as the picker mechanism 160, drive loader mechanism 272, and traverse mechanism 300. The flipper mechanism 122 has a center line C about which the flipper mechanism 122 symmetrically rotates. Flipper mechanism 122 is generally comprised of a side "A" cartridge holder plate 124 which has a cartridge guide lip 126 and a slot 127 therein. Side "B" cartridge holder plate 128 also suitably has a cartridge guide lip 130 and a slot 131. Both plates 124 and 128 have opposing plastic guides 132 for retaining the cartridge 10 between the plates 124 and 128. Plates 124 and 128 are arranged about the center line as for symmetrical rotation of the flipper mechanism 122 and cartridge 10. Plates 124 and 128 are connected opposite the media store 80 by machined bar 134.

By this arrangement, a cartridge 10 may be moved into the flipper mechanism 122 with the assistance of guide lips 126 and 130 while the cartridge is retained within the confines of plates 124 and 128 in a sandwich-like manner by way of plastic guides 132. Machine bar 134 supports side "A" pin or flag 136 and side "B" flags or pins 138.

Adjacent bar 134 is bracket 140 which connects to machine bar 134 by way of a bearing assembly 142 and shaft 144. A timing belt 146 is suitably wrapped around the timing pulley 148 connected to shaft 144 and pulley 150. Pulley 150 suitably is attached to shaft 152 of flipper motor 154. A bracket 140 suitably supports another photointerruptor 156 similar to the previous photointerruptor 70 but manufactured and marketed by Sharp Electronics Corporation of Mahwah, N.J., under the part no. GP1A05HR which will permit the apparatus 31 to count the number of flags 136 or 138 which pass through the photointerruptor 156. That is, when the flipper mechanism 122 is rotated about center line C, pins 136 and 138 will pass through photointerruptor or optical sensor means 156 which will permit the apparatus to know whether side "A" or side "B" is upwardly oriented by counting one pin 136 or two pins 138 interruptions through the sensor 156.

Bracket 140 supports a flag 157 on the opposite end of bracket 140 from flipper motor 154. Adjacent flipper flag 157 are a flipper lay right stop 158 and a flipper lay left stop 159. Stops 158 and 159 preferably are spring loaded to effect a cushioned stop of the flipper mechanism 122 when it either lays left or lays right for either the left or right optical disk drive 20. The functions of the flag 157 and stops 158 and 159 will be appreciated later in this specification along with the traverse mechanism 300.

At the opposite end of the picker mechanism bracket 162 from the flipper mechanism bracket 140 is located a retro-reflective optical sensor 227 which permits the apparatus 31 to know if there is a cartridge 10 within the particular slot 90.1–90.20 of the cartridge store 80. This sensor 227 is important in that it will inform the apparatus 31 as to whether there is a cartridge 10 in the particular slot 90 to be picked or whether a cartridge within the flipper mechanism 122 has an open slot 90 into which the particular cartridge 10 may be pushed therein by the picker mechansim 160. Honeywell Corporation of Richardson, Tex. appropriately manufactures and markets a retro-reflective sensor under part no. HOA-1180-3.

More specifically referring to FIGS. 5–10, the details of the picker mechanism 160 may be observed and appreciated. A picker mechanism bracket 162 supports block guide shafts 164 and 166. A pusher block 168 appropriately has a journaled hole 170 therethrough for block guide shaft 166 to pass therethrough. Projections or ears 172 are on the pusher block 168 to engage and straddle the guide shaft 164 to prevent rotation of pusher block 168 block guide shaft 166. Pusher block 168 also has a dowel pin hole 174 discussed below. Pusher block 168 supports a front pin or puller 176 and a rear pin or pusher 178. On the front side of pusher block 168 is a cartridge push surface or projection 180 along with a picker stop or bar 182. A belt clamp 184 is located on the pusher block 168 from which extends picker flag 186 having a leading or forward edge 188 and a trailing edge 190.

A picker block 192 is also suitably mounted onto block guide shaft 166 by way of hole 194 therethrough. Picker block 192 has a front stop surface 196 and a friction device 198 located within the picker block 192 and about lower guide shaft 166 for controlled frictional movement of the picker block 192 and pusher block 168 along lower block guide shaft 166. Bal Seal Engineering Company, Inc. of Santa Ana, Calif. manufactures and sells a suitable friction device 198 marketed under the part no. 314MB-106-G. Picker block 192 has a rearwardly directed dowel pin 200 which slides into and out of dowel pin hole 174 to assure alignment of both the pusher and picker blocks 168 and 192 with respect to each other.

Picker 204 is suitably mounted on the picker block 192 in a rotatable manner by way of pivot pin 206 which may be a shoulder screw with a bearing assembly. Picker 204 includes a pin leg 208 which has an inside surface 210, which may engage front pin 176, and an outside surface 212 which engages rear pin 178. Picker 204 also supports a picker finger 214 which suitably engages and interlocks with the notch 12 of a cartridge 10. A timing belt 216 suitably passes through the belt clamp 184 of pusher block 168 and is wound around bracket pulley 218 and drive pulley 220. Drive pulley 220 is driven by motor shaft 222 and picker motor 224.

Figure 8:
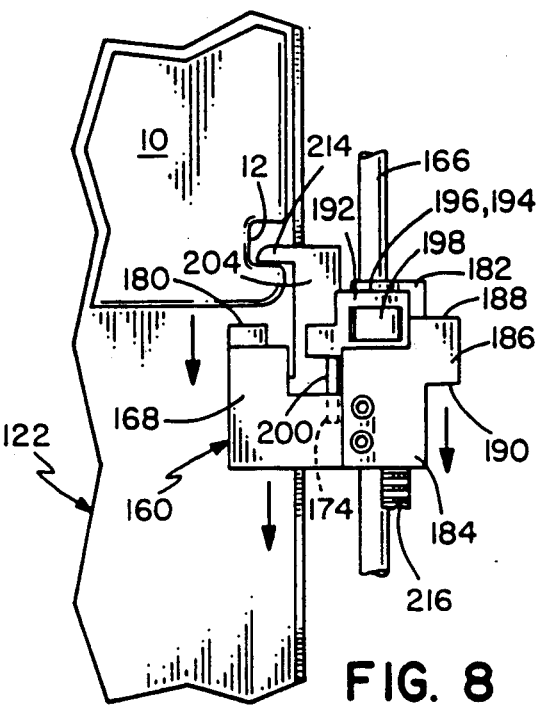
FIG. 8 is the same as FIG. 16 of applicant's copending referenced patent application which is an enlarged bottom, plan view of the picker mechanism engaged with and drawing a cartridge into the flipper mechanism.
Figure 9:
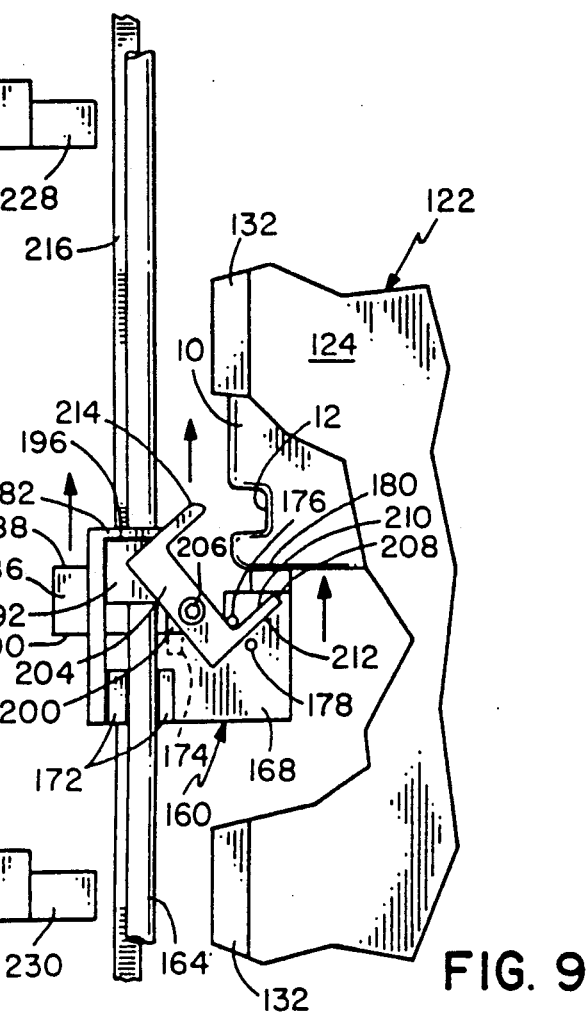
FIG. 9 is the same as FIG. 19 from applicant's copending patent application which is an enlarged view of of the picker mechanism pushing a cartridge out of the flipper mechanism.
Figure 10:
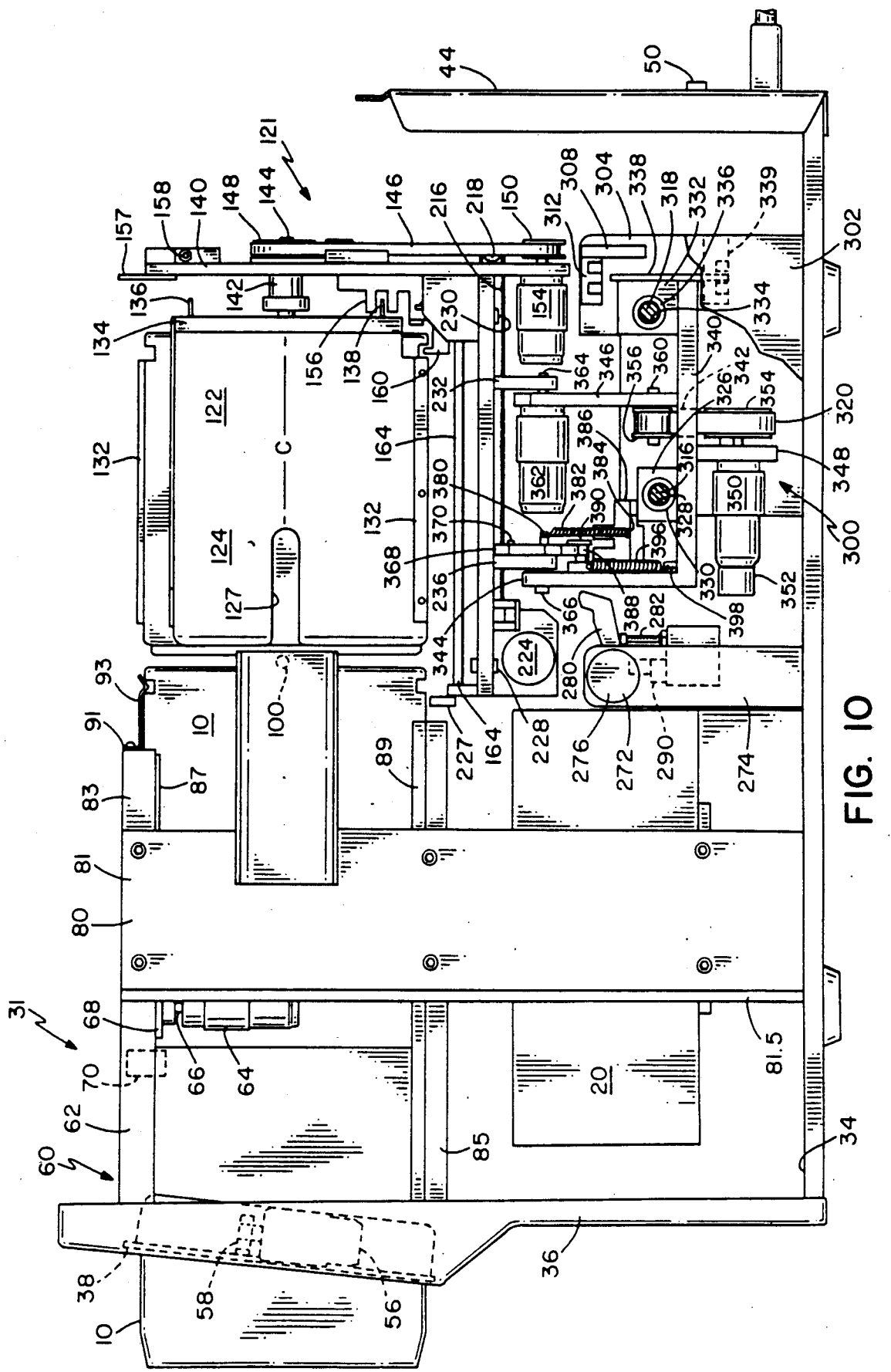
FIG. 10 is a right side elevational view of the apparatus.

By this arrangement, the cartridge push surface 180 of pusher block 168 may push cartridge 10 out of flipper mechanism 122 (FIG. 9) while rear pin 178 pushes on the outer surface 212 of pin leg 208 to rotate picker 204 out of engagement with notch 12 of cartridge 10. When pusher block 168 is moved in the opposite direction by way of timing belt 216, picker stop or bar 182 catches the front stop surface 196 of picker block 192. Front pin 176 appropriately pulls or hooks inside of the inside surface 210 of picker 204 and rotates the picker finger 214 on shoulder screw 206 into engagement with the notch 12 of a cartridge 10 to pull the cartridge 10 in the same direction as pusher block 168 and into the flipper mechanism 122 (FIGS. 8 and 9).

The picker mechanism bracket 162 appropriately supports a picker-store photointerruptor or optical sensor 228 adjacent the cartridge store 80 and a picker-home photointerruptor or optical sensor 230 at the other end of picker bracket 162 and somewhat adjacent to machined bar 134 at the picker mechanism's home/-retracted position. By this arrangement and as the picker mechanism 160 moves to the store 80, the picker flag's 186 leading forward edge 188 will pass through picker-store sensor 228 and stop the movement of timing belt 216. When the picker mechanism 160 is moving in the opposite direction away from the store 80, the trailing edge 190 of the picker flag 186 passes through picker-home sensor 230 and stops the timing belt 216 which will halt the rearward movement of the picker mechanism 160. The apparatus 31 under the control of the microprocessor and firmware within the apparatus 31 may then move the picker mechanism 160 slightly forward to rotate the picker finger 214 out of engagement with notch 12 of the cartridge 10 by way of rear pin 178 engaging the outer surface 212 of the pin leg 208 of picker 204. Optical sensor means 228 and 230 appropriately may utilize the above-mentioned photointerruptors by Sharp Electronics Corporation.

The picker mechanism bracket 162 is suitably joined to the flipper mechanism bracket 140 adjacent flipper motor 154. The lower side of picker bracket 162 has a rearwardly located picker bracket pivot support portion or ear 232 with a configured or keyed hole 234 passing therethrough which will be appreciated later in this specification. Forward of ear 232 is another picker bracket pivot support portion or ear 236. Ears 232 and 236 pivotally support the flipper and picker mechanisms 122 and 160 on top of the traverse mechanism 300 discussed below.

The drive loader mechanisms 272 are visible in FIGS. 5, 6, 10, 11, 15, 17, and 19-21. The drive motor mechanisms 272 are mirror images of each other and are located below the picker mechanism 160 and in front of the optical disk drives 20, and particularly their respective slots 26. A single drive loader mechanism 272 will be described.

An adjustable bracket 274 is mounted on base plate 34 and supports a drive loader motor 276. The motor 276 rotates shaft 278 upon which are located a load arm 280 and a load arm flag 284. Below load arm 280 is an adjustable stop 282. Load arm flag 284 appropriately has a retracted edge 286 and an extended edge 288 which will pass through the load arm photointerruptor 290 which will stop and reverse motor 276. By this arrangement, load arm 280 may be rotated up through the slots 127 and 131 of the flipper mechanism 122 after the picker mechanism 160 has moved the cartridge 10 until the leading edge 188 of flag 186 has interrupted sensor 228 after which the load arm 280 pushes the cartridge 10 into the optical disk drive 20 and then returns to its retracted position (see FIGS. 20 and 21).

FIGS. 5, 6, and 10-19 clearly depict the traverse mechanism 300. Traverse mechanism 300 includes right side support plate 302 and left side support plate 304 opposing each other and mounted on base plate 34. Support plate 302 has a right flipper mechanism support arm 306 which will receive flipper lay right stop 158 on flipper bracket 140. Left support plate 304 has a left flipper mechanism support arm 308 which will support flipper lay left stop 159 on bracket 140. Right plate 302 also supports a traverse lay right photointerruptor 310 which works with flipper flag 157 on bracket 140 to inform the apparatus 31 that the flipper mechanism 122 is in the lay right position. Left plate 304 supports the traverse lay left photointerruptor 312 which similarly works with flipper flag 157 to inform the apparatus 31 of the flipper mechanism 122 being in the lay left position.

Between right and left side support plates 302 and 304 is forward traverse guide shaft 316 and rear traverse guide shaft 318 along with a stationary timing belt 320 which is held onto plates 302 and 304 at its distil ends by ways of right plate belt fastener 322 and left plate belt fastener 324 suitably being affixed to plates 302 and 304. Forward traverse guide block 326 has an aperture 328 therethrough suitably with bushing 330 therein. Forward traverse guide shaft 316 passes through bushing 330. Rear traverse guide block 332 also has aperture 334 wherein bushing 336 is located. Rear traverse guide shaft 318 passes through bushing 336. Fixed to rear traverse guide block 332 is traverse home flag 338 which will pass into traverse home photointerruptor 339 when the traverse mechanism is all the way to the right or in its home or zero position for initialization.

Guide blocks 326 and 332 have a traverse base plate suitably fastened to their bottom sides which appropriately may have a timing belt opening 342 suitably to permit timing belt 320 to pass therethrough as explained below. Traverse base plate 340 supports a forward traverse pivot support plate 344 and a rear traverse pivot support plate 346 which suitably align adjacent with the support portions or ears 232 and 236 of the picker mechanism bracket 162. Below base plate 340 is located a traverse motor mount 348 which supports a motor 350 with a shaft which has an encoder 352 thereon. Drive pulley 354 is connected to motor 350 and has the stationary timing belt 320 wrapped therearound from which the belt 320 extends upwardly through belt opening 342 in traverse base plate 340 and is wrapped around right idler pulley 356 and left idler pulley 358, respectively.

Idler pulleys 356 and 358 are supported on shafts 360 which extend through and from rear pivot support plate 346. The encoder 352 counts the revolutions of motor 350. After initialization of the traverse mechanism 300, the encoder 352 provides the apparatus 31 with information as to the exact location of the traverse mechanism with respect to the base plate 34 of the apparatus 31 along stationary timing belt 320.

Traverse pivot means or motor 362 is appropriately fixed to or mounted on rear traverse pivot support plate 346. The shaft 364 of pivot motor 362 is keyed into configured hole 234 of picker bracket pivot support ear 232 which thereby will pivot the picker mechanism to the lay right or lay left position.

Figure 14:
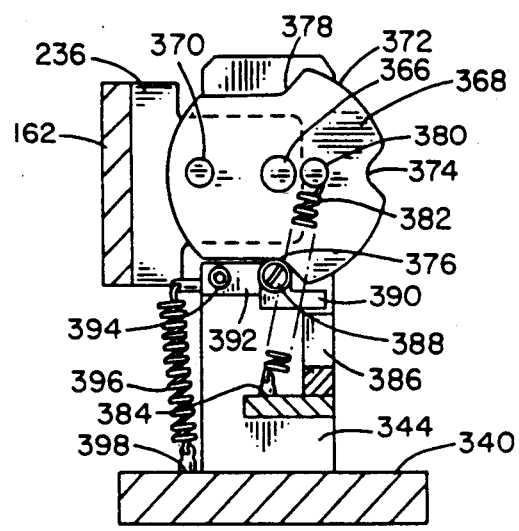
FIG. 14 is a broken away, cross-sectional view of the cam arrangement and traverse mechanism pivoted to lay right.
Figure 15:
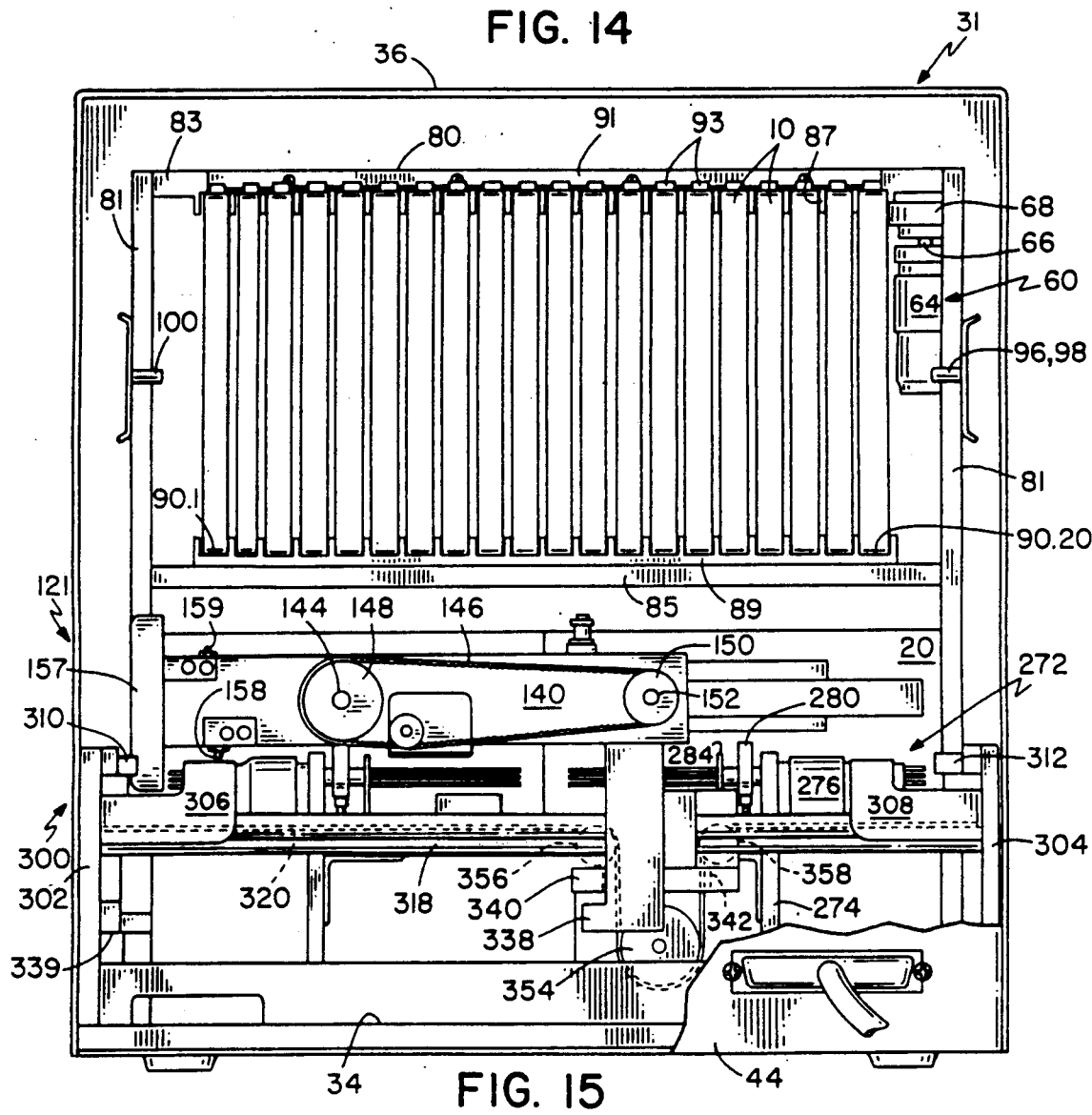
FIG. 15 is a rear elevational view of the apparatus with the flipper and traverse mechanisms pivoted to lay right.
Figure 16:
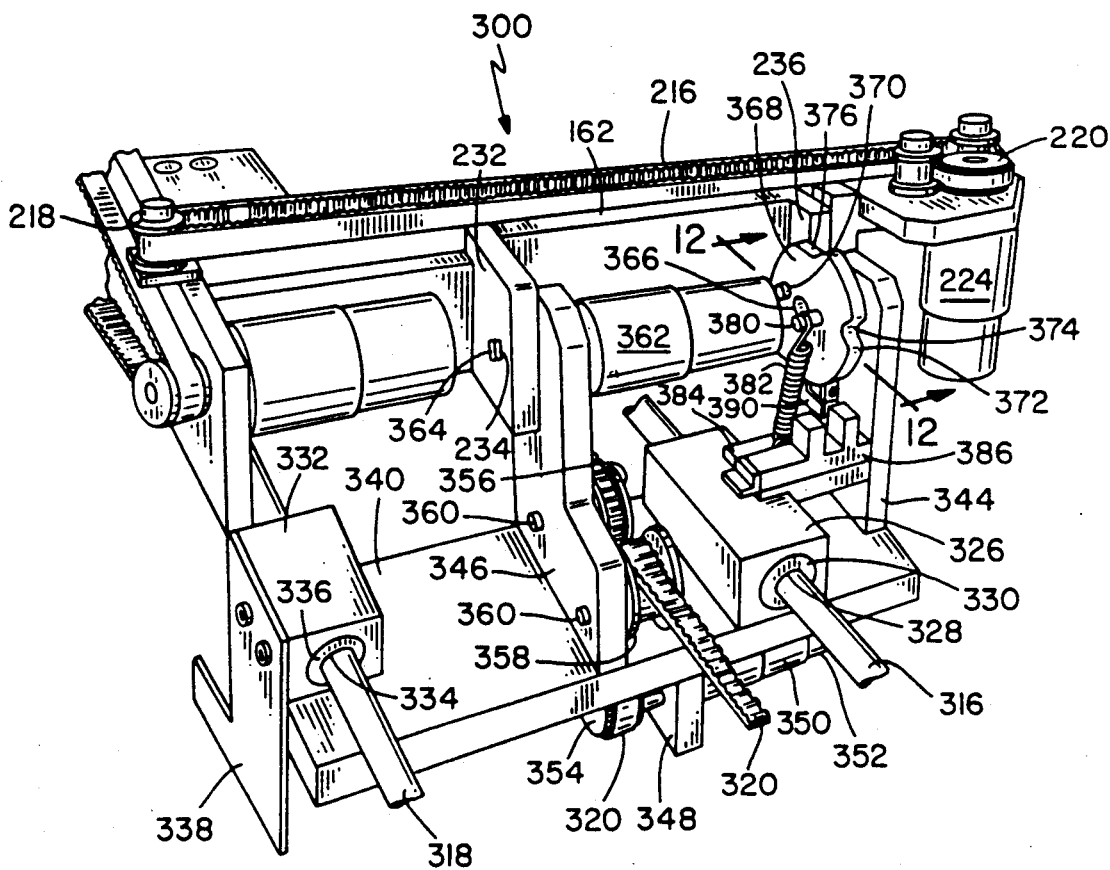
FIG. 16 is a perspective view of the traverse mechanism broken away in a lay right position.
Figure 20:
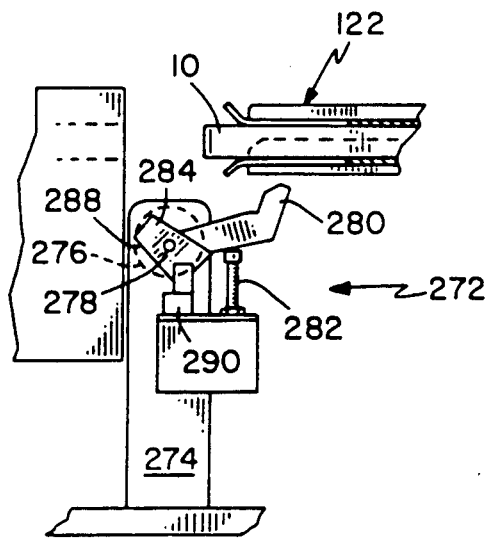
FIG. 20 is a side elevational view of the drive loader mechanism in retracted position.
Figure 21:
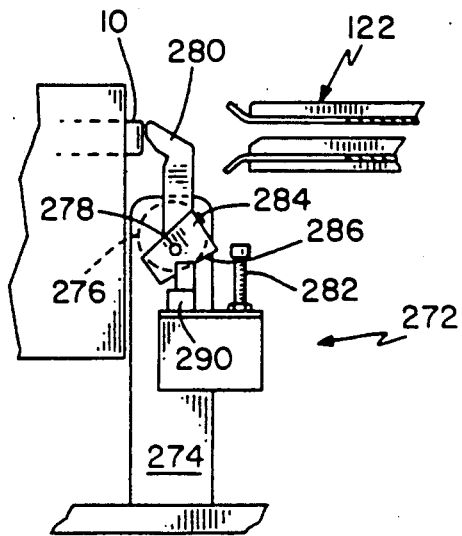
FIG. 21 is a side elevational view of the drive loader mechanism in extended position.
Figure 18:
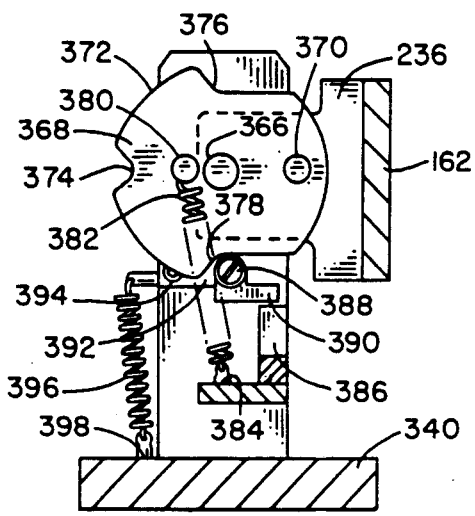
FIG. 18 is a broken away, cross-sectional view of the cam arrangement and traverse mechanism pivoted to lay left.
Figure 17:
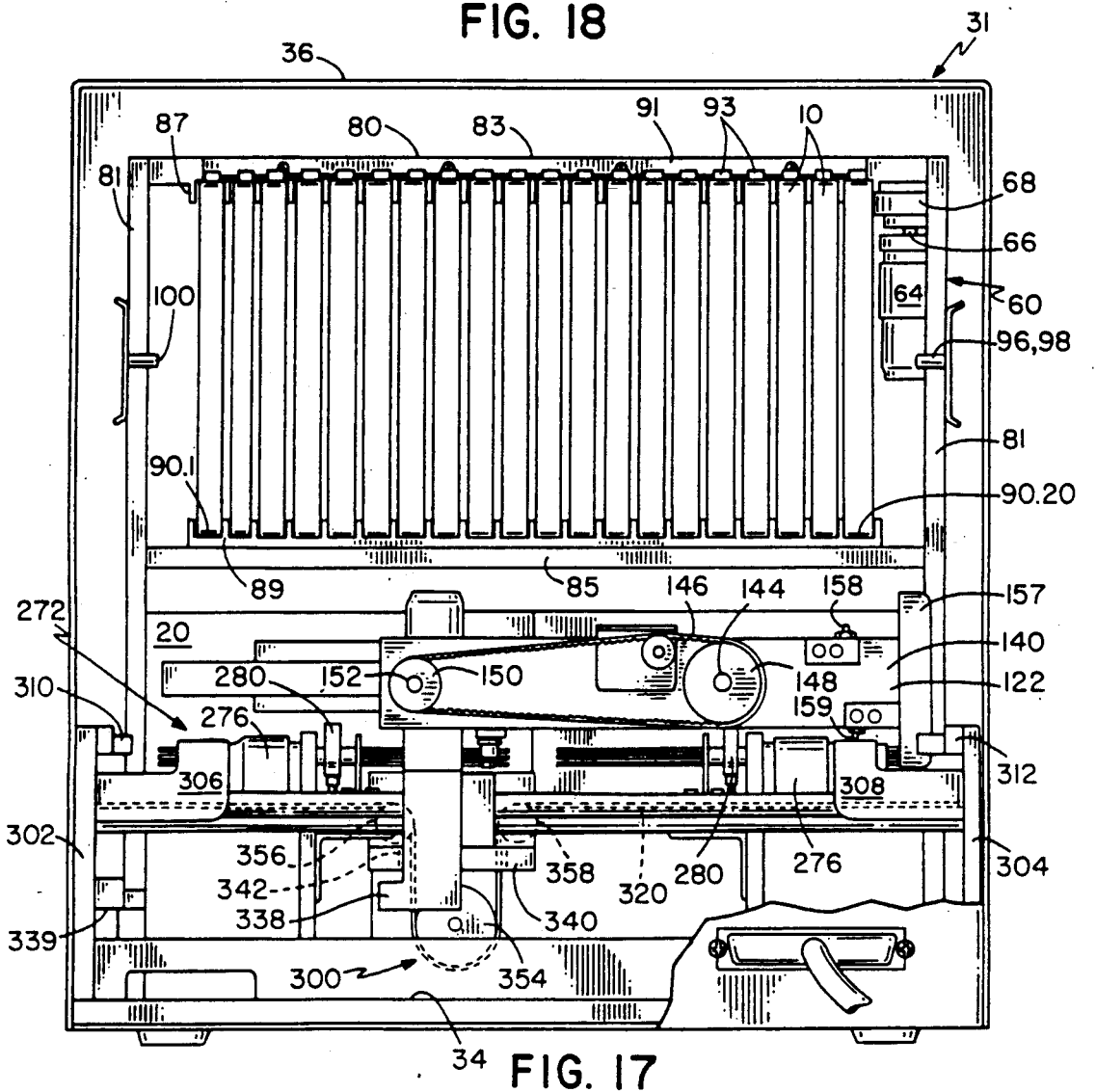
FIG. 17 is a rear elevational view of the apparatus with the flipper and traverse mechanism pivoted to lay left.
Figure 19:
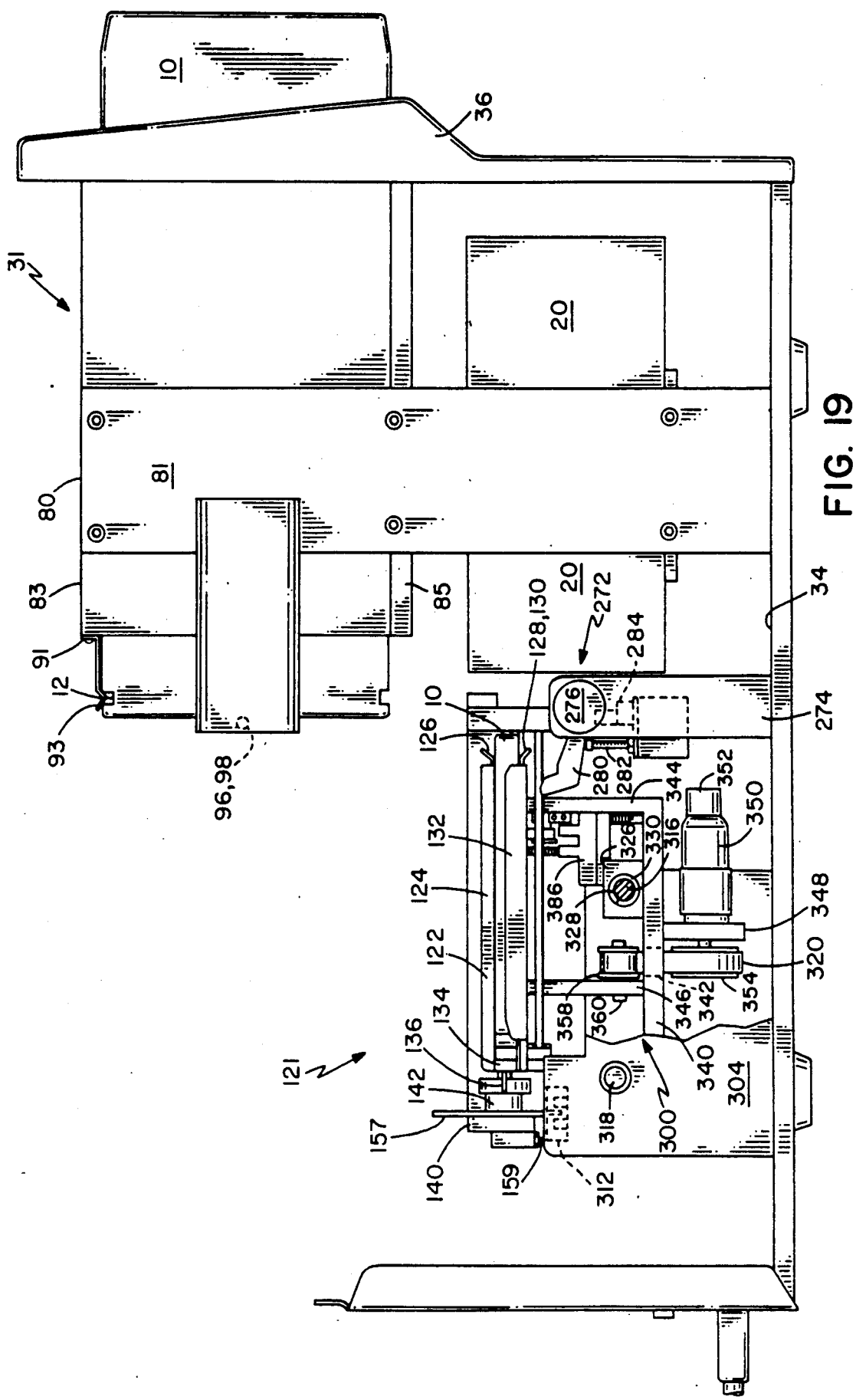
FIG. 19 is a left side elevational view of the apparatus with the flipper and transverse mechanisms pivoted to lay left.

As explained, the pivot motor 362 drives the lay left or lay right pivot motion of the flipper mechanism 122 from the rear traverse pivot support plate 346. The cam arrangement now to be discussed assists in the lay left and lay right pivot motion of the flipper mechanism 122 together with its position sensing ability. Pivot pin 366, upon which the flipper mechanism 122 passively pivots, passes through forward pivot support plate 344, forward picker bracket pivot support ear 236 and cam 368. Cam 368 has a cam screw or rivet 370 securing the cam 368 to the forward picker bracket pivot support ear 236. Cam 368 has a cam surface 372 with detents 374, 376 and 378. Detent 374, when engaged with cam follower 388, is indicative of the transverse mechanism 300 being in upright position (FIGS. 11 and 12). Detent 376, when engaged with the cam follower 388, is indicative of the traverse mechanism 300 being in the lay right position (FIGS. 14 and 15). Detent 378, when engaged with the cam follower 388, is indicative of the traverse mechanism being in the lay left position (FIGS. 17-19).

On the cam 368 is located a cam spring pin 380 connecting a cam spring 382 to the cam spring anchor plate 384. The cam spring 382 is oriented to assist the traverse mechanism 300 in smoothly and easily moving to its lay left or lay right position while somewhat biasing the traverse mechanism 300 in its vertical orientation. FIGS. 12-14 and 18 show the cam arrangement in the detail. The traverse pivot motion photointerruptor 386 is mounted on the cam spring anchor plate 384. The cam follower 388 supports a cam flag 390 and has a cam follower arm 392 extending away from the follower 388. The cam follower arm 392 is pivotally mounted to the forward traverse pivot support plate 344 and is biased by the cam follower arm spring 396 which is anchored at 398.

By this arrangement, the biased cam follower 388 rides on the cam surface 372. When the cam follower 388 is within any of the three detents 374, 376 and 378, the cam flag 390 is not within the photointerruptor 386. However, when the traverse mechanism 300 pivots or begins to lay left or lays right, the cam follower 388 is on the cam surface 372 and the cam flag 390 is within the traverse pivot motion photointerruptor 386 to inform the apparatus 31 of the flipper mechanism's 122 motion towards any one of its three positions, upright, lay left or lay right.

In operation, the apparatus 31 is initially hooked up to a host computer by SCSI connectors 52. However, several of the apparati 31 may be daisy-chained together. After power has been fed to the apparatus 31 through power plug 46, the power switch 50 is turned on which will also turn on fan 48 to cool the apparatus 31. Apart from the apparatus being controlled by a host computer by way of common command set commands, the apparatus 31 includes control electronics (not shown) such as printed wire assemblies, firmware and switch panels. A microprocessor or microcontroller may be operatively used by way of a microcode routine which receives sensor inputs, RAM and EPROM memory to control the DC motors and their motor drivers circuits.

With the power turned on to the apparatus 31, the apparatus initializes by way of the flipper mechanism 122 being in its upright position and the traverse mechanism 300 moving all the way to the right side of the apparatus 31 until the traverse home flag 338 interrupts the traverse home photointerruptor 339. Thereafter, the traverse mechanism 300 moves the flipper mechanism 122 and particularly retro-reflective sensor 227 to slot position 90.20 to see if there is a cartridge 10 there. The encoder 352 will have performed the counting function as to the lateral position of the picker mechanism 160 with respect to the cartridge store 80 or the particular optical disc drive 20. Thereafter, the host computer may inform the apparatus 31 that a cartridge 10 is to be received into the apparatus 31. Sliding door 38 is initially opened. As the cartridge 10 is fed into the slot 37, the import/export element 60 receives the cartridge 10 and motor 64 moves the cartridge into slot 90.20 of the cartridge store 80 if the retro-reflective sensor 227 has previously observed the particular slot 90.20 to be available for a cartridge 10. The flipper mechanism 122 will move to that slot 90.20 and sample pick and return the cartridge. The flipper mechanism 122 may be moved to the left or right along the cartridge or media store 80 to pick any cartridge 10 therein. Alternatively, the flipper mechanism 122 may be laid down into either a left (FIG. 17) or a right (FIG. 15) position to either receive or move a cartridge or into either of the respective optical disk drives 20. During any of these operations, the flipper mechanism may invert or flip a particular disk 10. The apparatus 31 is familiar with the exact location of all the slots 90 by way of the sensors, firmware, its memory and the encoder's 352 counting of the revolutions of motor 150. It can be appreciated that before the traverse mechanism 300 permits the flipper mechanism 122 to lay left or lay right, the motor 350 will move the traverse base plate 340 to a position that will permit adequate space so that the flipper mechanism 122 may indeed lay left or lay right as indicated by action of the flat 157 tripping either of the right photointerruptor 310 or left photointerruptor 312.

A simple routine might be as follows. There are several cartridges 10 located within the cartridge store 80. The import or export element 60 may receive a new cartridge into empty slot 90.20 or may reject the cartridge from that particular slot 90.20. The flipper mechanism 122 locates itself by movement of the transverse mechanism 300 to a particular slot 90 so that the picker mechanism 160 may pick a cartridge 10 and draw it into the flipper mechanism 122. The flipper mechanism 122 may or may not invert the particular disk 10. Next, the traverse mechanism 300 adjusts itself to the left or the right to provide adequate swinging space to permit the flipper mechanism 122 to lay left or lay right in front of either the left hand or right hand optical disk drive 20. Thereafter, the picker mechanism 160 may push a cartridge 10 into a particular drive slot 26. The drive loader mechanism 272 will assist the last movement of the cartridge 10 into the particular drive slot 26. Thereafter, the flipper mechanism 122 may approach either the cartridge store 80 or the other remaining optical disk drive 20. After a particular cartridge 10 has been read or written upon in the particular drive 20, it may ejected and picked from the drive 20 by the picker mechanism 160 as it is drawn into the flipper mechanism 122. Thereafter, the cartridge may either be flipped or inverted, returned to a particular slot within the store 80 or returned to slot 90.20 from which the cartridge may be removed from the apparatus 31 by way of the import/export element 60.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed is:

1. An optical disk cartridge handling apparatus for storing, handling, reading and writing of optical disks stored in cartridges which store data comprising
    (a) an import/export element for loading and unloading the cartridges in the apparatus;
    (b) a cartridge store with slots therein for storing the cartridges;
    (c) a flipper mechanism adapted to receive one of the cartridges from either of the cartridge store or an optical disk drive with a cartridge slot and to invert the cartridge;
    d) a picker mechanism comprised of slidably aligned cartridge pusher and picker blocks mounted on a guide shaft for moving the cartridge into and out of the flipper mechanism from either of the cartridge store or the optical disk drive; and
    e) a traverse mechanism for supporting and moving the flipper mechanism along either one of two axes of motion to locate the flipper mechanism adjacent either of the cartridge store or the optical disk drive.

2. The optical disk cartridge handling apparatus of claim 1, wherein the slots in the cartridge store are vertically oriented.

3. The optical disk cartridge handling apparatus of claim 2, further comprising a second optical disk drive adjacent the first drive and both drives being located below the store.

4. The optical disk cartridge handling apparatus of claim 1, further comprising an optical disk drive loader mechanism in front of the optical disk drive.

5. The optical disk cartridge handling apparatus of claim 1, further comprising sensing means for informing the apparatus of the locations and orientations of the cartridges, and the flipper, the picker and the traverse mechanisms.

6. The optical disk cartridge handling apparatus of claim 1, wherein the traverse mechanism comprises:
    (a) a traverse base supporting the flipper mechanism movably mounted along one axis within the apparatus to position the flipper mechanism in front of one of the slots of the cartridge store; and (b) a traverse pivot means to pivot the flipper mechanism along the other axis within the apparatus to position the flipper mechanism in front of either of the optical disk drive slot or one of the cartridge store slots.

7. The optical disk cartridge handling apparatus of claim 1, further comprising a bracket supporting the flipper mechanism pivotally connected to a movable traverse base plate to position the flipper mechanism along the two axes in front of either of the optical disk drive slot or one of the cartridge store slots.

8. The optical disk cartridge handling apparatus of claim 7, further comprising a cam interlocked with the bracket having a cam surface with detents and a follower to assist in correctly positioning the flipper mechanism along the pivoting axis of motion in front of either of the optical disk drive slot or one of the cartridge store slots.

9. The optical disk cartridge handling apparatus of claim 1, further comprising a transverse pivot motor for pivoting the bracket and flipper mechanism and optical sensing means connected to the follower for sensing cam and flipper mechanism pivotal movement and location.

10. The optical disk cartridge handling apparatus of claim 1, further comprising a transverse guide shaft parallel with respect to the one axis and suitably supporting the transverse base plate; and a parallel stationary timing belt and a motor with a drive pulley mounted on the plate contacting the belt for moving the traverse base plate.

11. The optical disk cartridge handling apparatus of claim 1, wherein a bracket supports the flipper mechanism and the traverse mechanism further comprising a movable traverse base plate mounted on a guide shaft and a stationary timing belt both parallel with respect to the one axis, a motor with a drive pulley mounted on the plate contacting the belt for moving the traverse base plate, a cam interlocked with the bracket having a cam surface with detents and a follower, the cam and bracket being pivotally connected to the movable traverse base plate, a traverse pivot motor for pivoting the bracket and flipper mechanism, sensing means on the base plate for sensing flipper mechanism pivotal movement and an encoder on the base plate motor for sensing the position of the traverse base plate with respect to the timing belt.

12. An optical disk cartridge handling apparatus for storing, handling, reading and writing of optical disks stored in cartridges which store data comprising (a) an import/export element for loading and unloading the cartridges in the apparatus;

(b) a cartridge store with vertical slots therein for storing the cartridges;

(c) a flipper mechanism supported by a bracket adapted to receive one of the cartridges from either of the cartridge store or an optical disk drive with a cartridge slot and to invert the cartridge;

d) a picker mechanism for moving the cartridge into and out of the flipper mechanism from either of the cartridge store or the optical disk drive; and e) a traverse mechanism comprised of a movable traverse base plate pivotally connected and supporting the bracket for supporting and pivotally moving the flipper mechanism along one axis of motion and for supporting and slidably moving the flipper mechanism along a second axis to locate the flipper mechanism adjacent either of the cartridge store or the optical disk drive.

13. The optical disk cartridge handling apparatus of claim 12, further comprising a second optical disk drive adjacent the first drive and both drives being located below the store.

14. The optical disk cartridge handling apparatus of claim 12, further comprising an optical disk drive loader mechanism in front of the optical disk drive.

15. The optical disk cartridge handling apparatus of claim 12, further comprising sensing means for informing the apparatus of the locations and orientations of the cartridges, and the flipper, the picker and the traverse mechanisms.

16. The optical disk cartridge handling apparatus of claim 12, further comprising a cam interlocked with the bracket having a cam surface with detents and a follower to assist in correctly positioning the flipper mechanism along the pivoting axis of motion in front of either of the optical disk drive slot or one of the cartridge store slots.

17. The optical disk cartridge handling apparatus of claim 1, further comprising a transverse pivot motor for pivoting the bracket and flipper mechanism and optical sensing means connected to the follower for sensing cam and flipper mechanism pivotal movement and location.

18. An optical disk cartridge handling apparatus for storing, handling, reading and writing of optical disks stored in cartridges which store data for a computer comprising (a) an import/export element for loading and unloading the cartridges in the apparatus;

(b) a cartridge store with vertical slots therein for storing the cartridges;

(c) a flipper mechanism supported by a bracket adapted to receive one of the cartridges from either of the cartridge store or from one of two optical disk drives each with a cartridge slot and to invert the cartridge;

(d) a picker mechanism for moving the cartridge into and out of the flipper mechanism from either of the cartridge store or the optical disk drive; and (e) optical disk drive loader mechanisms in front of the optical disk drives;

(f) a traverse mechanism for supporting and moving the flipper mechanism along either one of two axes of motion to locate the flipper mechanism adjacent of the cartridge store or either of the optical disk drives and a movable traverse base plate mounted on a guide shaft and a stationary timing belt both parallel with respect to the one axis, a motor with a drive pulley mounted on the plate contacting the belt for moving the traverse base plate along the one axis parallel to the shaft, a cam interlocked with the bracket having a cam surface with detents and a follower, the cam and bracket being pivotally connected to the movable traverse base plate, a traverse pivot motor for pivoting the bracket and flipper mechanism along the second axis, sensing means on the base plate for sensing flipper mechanism pivotal movement and an encoded on the motor for sensing the position of the traverse base plate with respect to the timing belt.

* * * * *